United States Patent
Kalisz et al.

(10) Patent No.: US 11,108,116 B2
(45) Date of Patent: Aug. 31, 2021

(54) ELECTROCHEMICAL CELL SEPARATOR

(71) Applicant: Energizer Brands, LLC, St. Louis, MO (US)

(72) Inventors: David Walter Kalisz, Rocky River, OH (US); Maria G. Verikakis, Lakewood, OH (US); Christopher S. Bolyos, Lorain, OH (US)

(73) Assignee: Energizer Brands, LLC, St. Louis, MO (US)

( * ) Notice: Subject to any disclaimer, the term of this patent is extended or adjusted under 35 U.S.C. 154(b) by 148 days.

(21) Appl. No.: 16/438,979

(22) Filed: Jun. 12, 2019

(65) Prior Publication Data

US 2019/0393469 A1  Dec. 26, 2019

Related U.S. Application Data

(60) Provisional application No. 62/687,509, filed on Jun. 20, 2018.

(51) Int. Cl.
*H01M 6/02* (2006.01)
*H01M 50/463* (2021.01)
(Continued)

(52) U.S. Cl.
CPC ........... *H01M 50/463* (2021.01); *H01M 6/02* (2013.01); *H01M 50/107* (2021.01);
(Continued)

(58) Field of Classification Search
None
See application file for complete search history.

(56) References Cited

U.S. PATENT DOCUMENTS

| 4,669,183 | A | 6/1987 | Duncan et al. |
| H001088 | H | 8/1992 | Marks |

(Continued)

FOREIGN PATENT DOCUMENTS

| EP | 1794826 B1 | 9/2012 |
| EP | 2135310 B1 | 4/2016 |

(Continued)

OTHER PUBLICATIONS

International Searching Authority, International Search Report and Written Opinion for International Application No. PCT/US2018/055463, dated Dec. 13, 2018, 15 pages, European Patent Office, Netherlands.

(Continued)

*Primary Examiner* — Wyatt P McConnell
(74) *Attorney, Agent, or Firm* — Alston & Bird LLP

(57) ABSTRACT

The discharge performance of a primary, bobbin-style electrochemical cell is improved by incorporating a separator formed from a continuous separator sheet defining a two-layer cylindrical sidewall and a closed bottom end between the included electrochemical cell cathode and anode. A first layer of the cylindrical separator is formed by rolling a first end of a continuous separator sheet into a cylinder having a central axis parallel with a longitudinal axis of the continuous separator sheet, and then rolling a second end of the continuous separator sheet around the exterior of the first cylindrical layer to form a second cylindrical layer. The closed bottom end is formed by a portion of the continuous separator sheet located between the rolled portion of the first end and the rolled portion of the second end.

16 Claims, 5 Drawing Sheets

(51) Int. Cl.
*H01M 50/107* (2021.01)
*H01M 50/403* (2021.01)
*H01M 50/449* (2021.01)

(52) U.S. Cl.
CPC ....... *H01M 50/403* (2021.01); *H01M 50/449* (2021.01); *H01M 2220/30* (2013.01)

(56) References Cited

U.S. PATENT DOCUMENTS

| | | |
|---|---|---|
| 6,177,210 B1 | 1/2001 | Lonsberry |
| 6,270,833 B1 | 8/2001 | Yamashita et al. |
| 6,596,121 B1 | 7/2003 | Reynolds, Jr. |
| 6,656,630 B2 | 12/2003 | Reichert et al. |
| 6,670,077 B1 | 12/2003 | Huang |
| 6,830,845 B2 | 12/2004 | Shoji et al. |
| 7,546,679 B2 | 6/2009 | Motherway et al. |
| 7,763,384 B2 | 7/2010 | Boone et al. |
| 7,799,455 B2 | 9/2010 | Smith et al. |
| 8,835,040 B2 | 9/2014 | Slivar |
| 8,835,050 B2 | 9/2014 | Silvar |
| 2002/0071915 A1 | 6/2002 | Schubert et al. |
| 2003/0096171 A1 | 5/2003 | Thrasher et al. |
| 2004/0058234 A1 | 3/2004 | Slezak |
| 2004/0229116 A1 | 11/2004 | Malinski et al. |
| 2008/0124621 A1* | 5/2008 | Smith .................. H01M 2/145 429/129 |
| 2009/0181294 A1* | 7/2009 | Yoppolo ................ H01M 6/08 429/142 |

FOREIGN PATENT DOCUMENTS

| | | |
|---|---|---|
| EP | 2345098 B1 | 6/2016 |
| WO | WO-1997/017736 A1 | 5/1997 |
| WO | WO-2004/064175 A2 | 7/2004 |

OTHER PUBLICATIONS

International Searching Authority, International Search Report and Written Opinion for International Application No. PCT/US2019/036781, dated Sep. 12, 2019, (14 pages), European Patent Office, Rijswijk, The Netherlands.

* cited by examiner

ELECTROCHEMICAL CELL SEPARATOR

CROSS-REFERENCE TO RELATED APPLICATIONS

This patent application claims priority from U.S. Provisional Application Ser. No. 62/687,509, filed Jun. 20, 2018, which is incorporated herein by reference in its entirety.

BACKGROUND

Alkaline electrochemical cells are commercially available in cell sizes commonly known as LR6 (AA), LR03 (AAA), LR14 (C) and LR20 (D). The cells have a cylindrical shape that must comply with the dimensional standards that are set by organizations such as the International Electrotechnical Commission. The electrochemical cells are utilized by consumers to power a wide range of electrical devices, for example, clocks, radios, toys, electronic games, film cameras generally including a flashbulb unit, as well as digital cameras.

Battery manufacturers have made great strides to improve the capacity of the cells to improve the length of time that electrical devices can be powered, while at the same time complying with the applicable dimensional standards for each cell size. As the shape and size of the batteries are often fixed, battery manufacturers must modify cell characteristics to provide increased performance. For example, battery manufacturers generally seek to maximize the total amount of active material, including both the positive electrode (cathode) material and negative electrode (anode) material, while still providing reliable cell constructions that are not prone to undesirable internal cell short circuits.

Due to consumers' increasing need for high-capacity electrochemical cells offering maximal run-time, there is a constant need for improved electrochemical cell constructions offering improved discharge performance.

BRIEF SUMMARY

To provide increased electrochemical cell discharge performance, various embodiments are directed to electrochemical cell constructions comprising a hollow container housing having a tubular cathode ring surrounding an interior of the hollow container and having an anode positioned therein. The anode and cathode are separated by a continuous separator sheet folded to form a two-ply separator barrier between the cathode and anode. The separator encompasses a single elongated separator sheet folded perpendicularly to a longitudinal axis of the paper to form two sheet ends on opposite sides of the folds. Each of the sheet ends are then rolled into concentric cylinders having central axes parallel with a longitudinal axis of the elongated separator sheet, with opposing edges of each sheet end (parallel to the longitudinal axis of the sheet) meeting without overlap. The resulting tubular separator includes a two-ply cylindrical sidewall and single-ply bottom wall (formed from the sheet material extending between the sheet ends).

Certain embodiments are directed to a method of manufacturing an electrochemical cell. In certain embodiments, the method comprises: providing a cylindrical electrochemical cell can having an active material ring disposed proximate an interior surface of the cell can; forming a cylindrical separator comprising a continuous separator sheet defining a closed bottom end and a two-layer cylindrical sidewall; inserting the cylindrical separator end into the interior of the active material ring; disposing a second active material within an interior of the separator; and sealing the electrochemical cell can.

Moreover, forming the cylindrical separator may comprise forming a seam within each of the two layers of the cylindrical sidewall, wherein the seams are aligned with a diameter of the cylindrical sidewall. Forming the cylindrical separator may further comprise forming a first end of the continuous separator sheet into a first cylindrical layer; and forming a second end of the continuous separator sheet, opposite from the first end, into a second cylindrical layer around an exterior of first cylindrical layer.

In certain embodiments, forming the first end of the continuous separator sheet into a first cylindrical layer comprises rolling opposite longitudinal edges of the first end of the continuous separator sheet to meet at a first seam; and forming the second end of the continuous separator sheet into a second cylindrical layer comprises rolling opposite longitudinal edges of the second end of the continuous separator sheet to meet at a second seam. Moreover, the method may further comprise positioning a separator reinforcement layer adjacent the closed bottom end of the cylindrical separator. Positioning a separator reinforcement layer adjacent the closed bottom end may comprise positioning a reinforcing cup adjacent a bottom exterior surface of the closed bottom end. Positioning a separator reinforcement layer adjacent the closed bottom end of certain embodiments comprises positioning a reinforcing pad adjacent a bottom exterior surface of the closed bottom end.

Various embodiments are directed to an electrochemical cell comprising: a container; a ring-shaped cathode disposed within the container wherein the cathode includes an exterior surface in contact with the container and an interior surface surrounding a hollow interior; an anode disposed within the hollow interior of the cathode; and a separator positioned between the cathode and the anode, wherein the separator comprises a continuous separator sheet defining a closed bottom end and a two-layer cylindrical sidewall.

Moreover, the cylindrical separator may comprise a seam within each of the two layers of the cylindrical sidewall, wherein the seams are aligned with a diameter of the cylindrical sidewall. In various embodiments, a first layer of the cylindrical separator is formed from a first end a continuous separator sheet; and a second layer of the cylindrical separator is formed from a second end of the continuous separator sheet, rolled around an exterior surface of the first layer of the cylindrical separator sheet. The first end of the continuous separator sheet may be rolled into a first cylindrical layer such that opposing longitudinal edges of the first end of the continuous separator sheet meet at a first seam; and the second end of the continuous separator sheet is rolled around the first cylindrical layer such that opposing longitudinal edges of the second end of the continuous separator sheet meet at a second seam. Moreover, the continuous separator sheet may define lateral slits perpendicular to a longitudinal axis of the continuous separator sheet, wherein the lateral slits separate the first end and the second end of the continuous separator sheet. In certain embodiments, the first end is longer than the second end of the continuous separator sheet. Moreover, the length of each of the first end and the second end may be greater than the height of the ring-shaped cathode. In certain embodiments, the length of the first end is longer than the combination of the height of the ring-shaped cathode and a diameter of the hollow interior of the ring-shaped cathode.

In various embodiments, the electrochemical cell further comprises a separator reinforcement layer positioned adjacent the closed bottom end of the cylindrical separator. The separator reinforcement layer may comprise one of a reinforcing cup or a reinforcing pad. Moreover, the separator sheet may comprise a 3 mil separator paper.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Figure 1A:
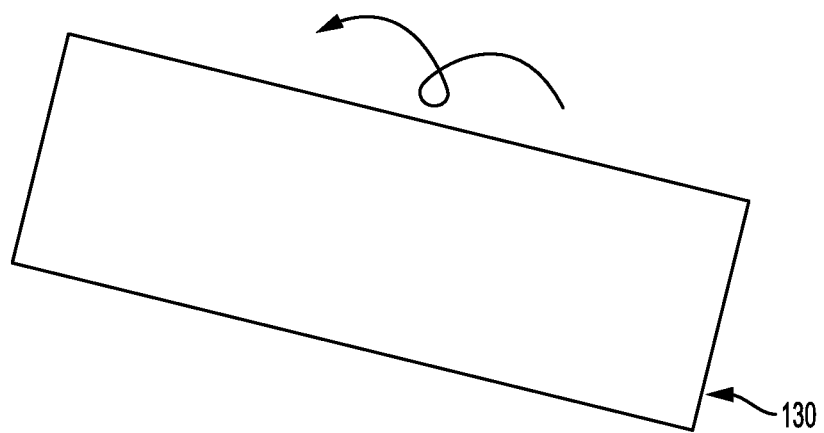
FIGS. 1A-1B illustrate the formation of a convolute separator as known in the art.
Figure 1B:
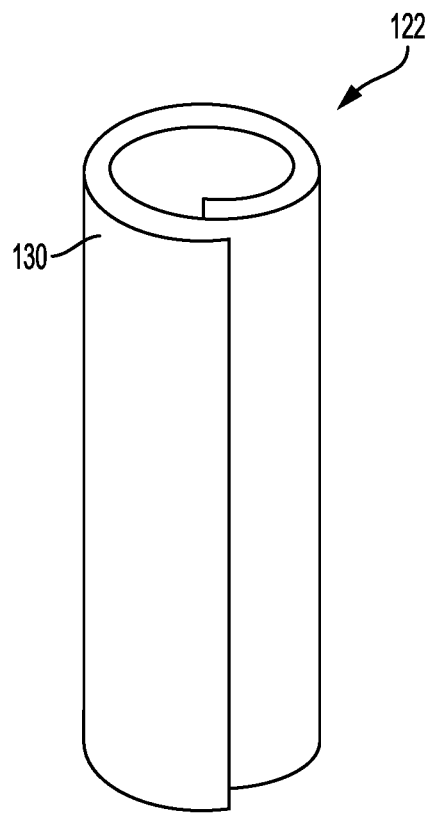
Figure 2A:
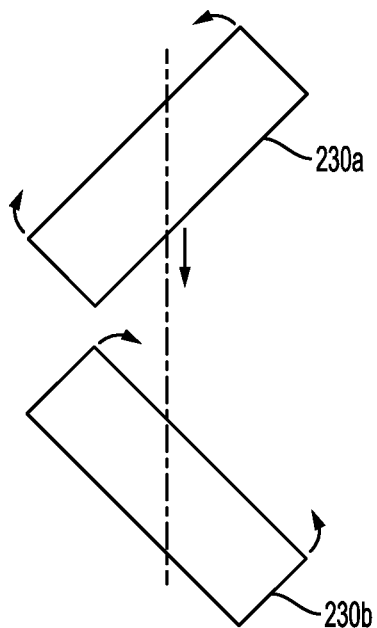
FIGS. 2A-2C illustrate the formation of a cross-strip separator as known in the art.
Figure 2B:
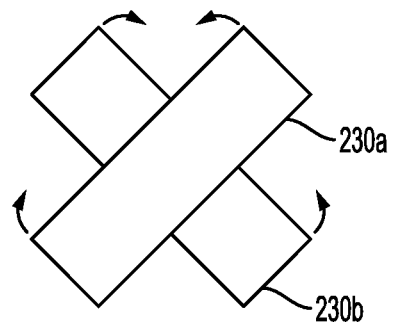
Figure 2C:
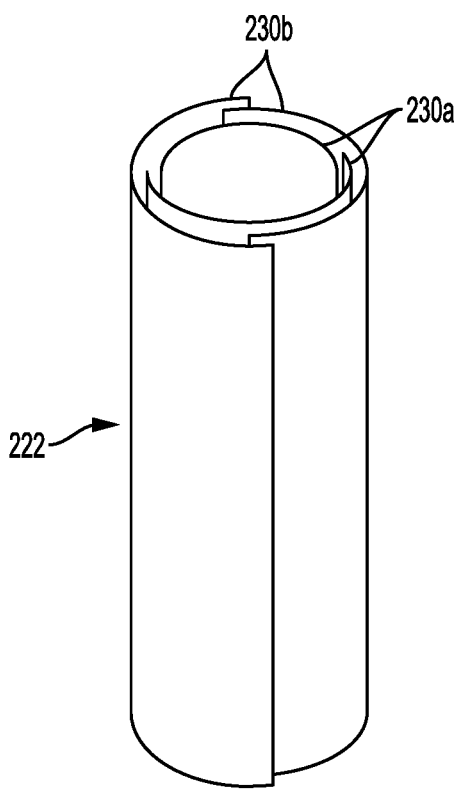

The inventors have found that increasing the thickness of an electrochemical cell separator positioned between active materials of an electrochemical cell beyond a thickness necessary to avoid short circuits through the separator can detrimentally increase the internal electrochemical cell resistance, thereby decreasing the electrochemical cell performance. This generally negative performance characteristic of overly thick separators occurs even when only a portion of a separator positioned within an electrochemical cell is too thick, which may result from overlapping portions of a separator sheet to avoid potentially problematic thin portions of the separator that may lead to short circuits. The problem of including overly thick separator portions is thus common in both convolute separator 122 configurations (embodied as a rolled separator sheet 133 having a single overlapping portion where opposite end portions of the separator sheet 133 partially overlap, as shown in FIGS. 1A-1B) and cross-strip separator 222 configurations (embodied as two perpendicular separator sheets 233a, 233b overlapping at a central portion of the sheets 233a, 233b and each having end portions folded upward to collectively form a cylindrical separator 222, as shown in FIGS. 2A-2C). The inventors found that the problem of increased internal cell resistance was more prominent with the use of cross-strip separators, because the number of overlapping portions (and therefore the overall percentage of the separator characterized by overly thick separator portions) is greater than that of convolute separators. Moreover, because cross-strip separators 222 utilize two separate components (e.g., two separate separator material strips 233a, 233b), the difficulty of manufacturing the separator is also increased.

The inventors have found that creating a cylindrical separator from a single, continuous separator sheet such that the continuous separator sheet maintains continuity (e.g., remains connected) among the sidewall layers and closed bottom end, by rolling a first end of the separator sheet into a first separator layer, and then folding the second end of the separator sheet to be tangent to the first separator layer and rolling the second end of the separator around the first separator layer to form a second separator layer, the overall percentage of the separator characterized by overly thick overlapping portions may be minimized. In certain embodiments, the first end and the second end of the separator sheet may separately be rolled such that portions of opposing longitudinal edges of the separator sheet meet without overlapping to form each of the first and second separator layers. The resulting seams of the cylindrical separator are positioned on opposite sides of the separator (e.g., 180 degrees apart from one another and along a common diameter of the separator) to minimize a risk of aligning the seams to create a potential short circuit between the separated active materials of the electrochemical cell.

Electrochemical Cell

Figure 3:
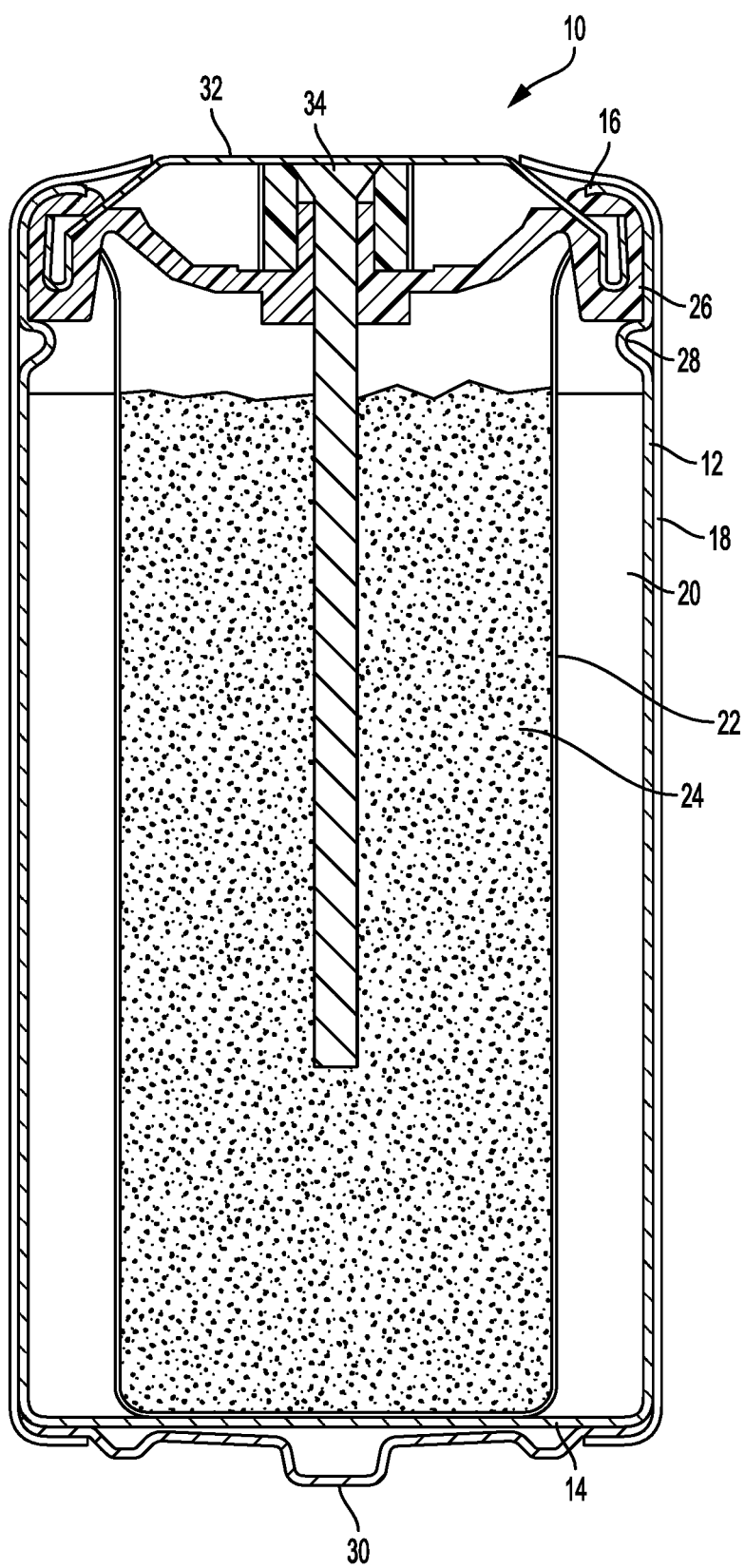
FIG. 3 is a cross-sectional view of a bobbin-style electrochemical cell according to one embodiment.

Referring now to FIG. 3, a bobbin-style electrochemical cell 10 is shown according to one embodiment of the present invention. In the illustrated embodiment of FIG. 3, the electrochemical cell is an alkaline cell having a manganese dioxide cathode active material and a zinc anode active material. However, it should be understood that the electrochemical cell may have any of a number of active material chemistries.

The alkaline electrochemical cell 10 shown in the exemplary embodiment and described herein is a cylindrical primary (non-rechargeable) battery cell of size LR6 (AA). However, it should be appreciated that the teachings of the present invention may be applicable to other alkaline electrochemical cells of other shapes and sizes, including LR03 (AAA), LR14 (C) and LR20 (D) size cylindrical battery cells, as examples. Moreover, although the following specifically discusses cylindrical electrochemical cells, it should be understood that various embodiments are applicable for other cell shapes, such as rectangular electrochemical cells, and/or the like. Additionally, the electrochemical cell 10 may be employed as a single cell battery or may be employed in a multiple cell battery.

The electrochemical cell 10 comprises a cylindrical container 12 that may be embodied as a metallic (e.g., steel) can, having a closed end 14, an open opposite end 16, and a cylindrical side wall extending between the opposite ends. The cylindrical container 12 is made of a suitable electrically conductive metal that may be formed into a desired shape and is adapted to seal the internal contents within the cell 10. In the embodiment shown, the cylindrical container 12 also functions as the cathode current collector, and therefore exhibits good electrical conductivity. In one embodiment, the cylindrical container 12 may be plated with nickel and cobalt, such as may be achieved in an annealing process. The interior surface of the cylindrical container 12 may be coated with a graphite, if desired. In one example of an LR6 size cell, the cylindrical container 12 has a wall thickness of about 0.010 inch (10 mils or 0.025 cm) and the cylindrical wall has an outside diameter of about 0.548 inch (1.392 cm).

A positive contact terminal 30 comprising a plated steel or other conductive metal material is welded or otherwise secured onto the closed end 14 of the cylindrical container 12 in the illustrated embodiment of FIG. 3. However, in certain embodiments, the positive contact terminal 30 may be integrally formed as a portion of the cylindrical container 12. The positive contact terminal 30 has a protruding nubbin (i.e., protrusion), at its center which serves as the positive contact terminal of the cell 10. Assembled onto the opposite open end 16 of the cylindrical container 12 is a collector and seal assembly made up of an anode current collector 34 (e.g., nail), a polymeric (e.g., nylon) seal 26 and a negative contact terminal 32. The open end 16 of container 12 is crimped onto the seal 26 which abuts bead 28 to seal closed the open end 16 of container 12. The negative contact terminal 32 forms a negative contact terminal of the cell 10. Positive and negative contact terminals 30 and 32 are made of electrically conductive metal and serve as the respective positive and negative electrical terminals. Additionally, a jacket 18 may be formed about the exterior surface of the cylindrical container 12, and may include an adhesive layer, such as a metalized, plastic film layer.

Disposed within the sealed volume of cylindrical container 12 is a positive electrode, referred to as the cathode ring 20, generally positioned adjacent the interior surface of the cylindrical container 12. The cathode has an exterior shape corresponding to the shape of the container (e.g., the cathode positioned within cylindrical container 12 has a generally cylindrical shape) with an interior surface defining an interior cavity therein. For example, the interior cavity may have a generally cylindrical shape having an inside diameter ID. However, it should be understood that the interior cavity may have any of a variety of shapes. As other examples, the interior cavity may have a star-shape, an elliptical shape, a "gear" shape (having a plurality of interconnected cavities extending around a central hub, thus providing the general shape of a gear), and/or the like. A separator 22 is disposed in the interior cavity and contacts the interior surface of the cathode ring 20. A negative electrode, referred to as the anode 24, is disposed within the interior cavity inside the separator 22. Additionally, an alkaline electrolyte solution, which can include water, is disposed within the sealed volume of the container 12 in contact with both the anode 24 and the cathode ring 20.

As discussed herein, the illustrated cathode ring 20 of FIG. 3 includes manganese dioxide ($MnO_2$) as the electrochemically active material of the positive electrode. Cathode ring 20 is generally formed of a mixture of manganese dioxide, graphite, barium sulfate, and aqueous alkaline electrolyte solution. According to an impact molding embodiment, the cathode 20 may be formed by disposing a quantity of the cathode mixture into the open ended container 12 and, with use of an impact molding ram, molding the mixture into a solid tubular (e.g., cylindrical) configuration that defines a cavity generally concentric with the side wall of the container 12. Alternately, according to a ring molding embodiment, the cathode ring 20 may be formed by preforming a plurality of rings (e.g., three or four rings) from the cathode mixture and then inserting the preformed rings into the container 12 to form the tubular shaped cathode ring 20. In certain embodiments, the interior surface of the cathode ring 20 (whether formed via impact molding or ring molding) may have a generally circular cross-section, a generally elliptical cross-section, a generally "star"-shaped cross-section, and/or the like.

The anode 24, also referred to herein as the negative electrode, may include a homogeneous mixture of an aqueous alkaline electrolyte, a zinc powder and a gelling agent, such as cross-linked polyacrylic acid. The zinc powder is the electrochemically active material of the anode 24. The aqueous alkaline electrolyte may include an alkaline metal hydroxide, such as potassium hydroxide (KOH), sodium hydroxide or mixtures thereof. A gelling agent suitable for use in the anode 24 may include a cross-linked polyacrylic acid, such as Carbopol 940®, which is commercially available from Noveon, Inc., of Cleveland, Ohio. Examples of other gelling agents that may be suitable for use in the cell 10 may include carboxymethyyylcellulose, polyacrylamide and sodium polyacrylate. The zinc powder may include pure zinc or zinc alloy. Additional optional components of the anode 24 may include gassing inhibitors, organic or inorganic anti-corrosive agents, binders or surfactants that may be added to the ingredients listed above. Examples of suitable gassing inhibitors or anti-corrosive agents include indium salts (such as indium hydroxide), perfluoroalkyl ammonium salts, alkali metal sulfides, etc. Examples of suitable surfactants include polyethylene oxide, polyethylene, alkylethers, perfluoroalkyl compounds and the like. The anode 24 may be manufactured by combining the ingredients into a ribbon blender or drum mixer and then working the anode mixture into a wet slurry.

In addition to the aqueous alkaline electrolyte absorbed by the gelling agent during the anode manufacturing process, an additional quantity of aqueous solution containing a solution of potassium hydroxide and water, also referred to herein as free electrolyte, is added to the electrochemical cell 10 during the manufacturing process. The free electrolyte may be incorporated into the cell 10 by disposing it into the cavity defined by the cathode ring 20 after the separator 22 is inserted and may also be injected after the anode 24 is disposed into the cell. According to one embodiment, the aqueous solution contains approximately thirty-seven percent (37%) by weight KOH, and sixty-three percent (63%) deionized water.

In the bobbin-type zinc/manganese dioxide alkaline cell 10 shown and described herein, the separator 22 may be provided as a layered ion permeable, non-woven fibrous fabric which separates the cathode ring 20 from the anode 24. The separator 22 maintains a physical dielectric separation of the cathode electrochemically active material (manganese dioxide) and the anode electrochemically active material (zinc) and allows for the transport of ions between the positive and negative electrode materials. Additionally, the separator 22 acts as a wicking medium for the aqueous electrolyte solution and as a collar that prevents fragmented portions of the anode 24 from contacting the top of the cathode ring 20. Moreover, as shown and discussed herein, the separator 22 of certain embodiments comprises a continuous separator sheet folded to form a two-layer cylindrical sidewall and a closed bottom end, such that a first layer of the cylindrical sidewall is continuous with the closed bottom end (e.g., across a fold) and the second layer of the cylindrical sidewall is continuous with the closed bottom end (e.g., across a fold), such that the cylindrical separator 22 comprises a single, continuous piece of separator material.

The separator 22 comprises an ion permeable material having a high electrical resistance (i.e., low electrical conductivity), such as a thin nonwoven fabric. Depending in part on thickness and resistivity, the separator may be a single-ply or multi-ply (e.g., two-ply) construction to provide a desired porosity to achieve the desired electrical resistance and ion-permeability while maintaining a low overall volume within an electrochemical cell. In various embodiments, the separator material may have a 3 mil thickness, a 4 mil thickness, a 5 mil thickness, and/or the like, however it should be understood that other separator material thicknesses may be utilized. As mentioned above, because the overall volume of electrochemical cells is generally fixed, minimizing the overall volume of non-active materials (such as the separator) within an electrochemical cell provides additional volume within the cell that may be occupied by electrochemical materials such as those of the cathode and/or anode.

The fabric of the separator 22 may be embodied as a fiber paper comprising natural, artificial, and/or synthetic fibers. For example, the fiber paper may comprise a blend of synthetic and artificial fibers, a blend of synthetic fibers and natural materials (e.g., wood pulp), and/or the like. As a specific example, the fiber paper may comprise fibrillated cellulose fibers and synthetic fibers. In certain embodiments, the synthetic fibers may comprise a thermoplastic material, such as polyvinyl alcohol fibers having a melting point of at least about 60° C., phenylboronic acid fibers (PBA fibers), and/or the like. In certain embodiments, the synthetic fibers may comprise first synthetic fibers that are soluble in water at a temperature of at least 60° C. and second synthetic fibers that are insoluble in water. Moreover, the fiber paper may comprise solvent spun cellulose fibers subject to fibrillation in well-known refinement and digestion processes in paper manufacturing.

Figure 4A:
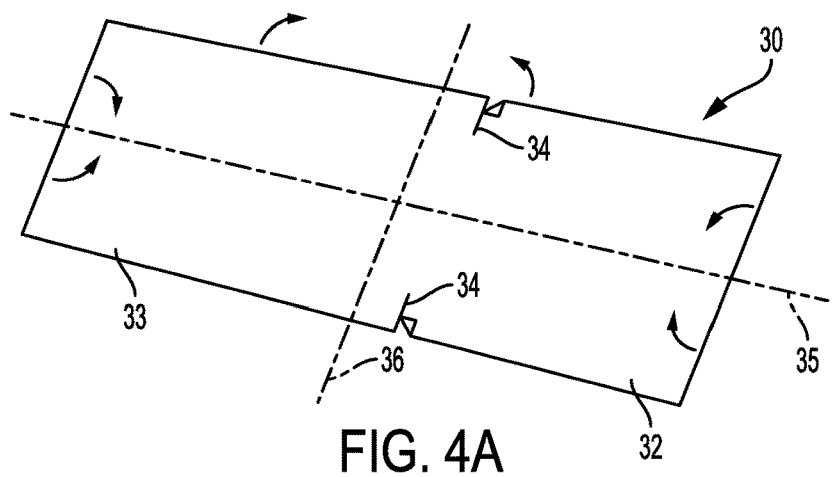
FIGS. 4A-4D illustrate steps for forming a separator according to one embodiment.

The combination of the cellulose fibers and the synthetic fibers provide a porous, nonwoven fabric that may be formed into a tubular shape before being inserted into an electrochemical cell 10. FIGS. 2A-2D illustrate a process for forming the separator into a tubular shape according to one embodiment. As shown in FIG. 4A, the separator material is initially provided as a continuous, elongated, planar fabric sheet 30. The width of the fabric sheet (measured perpendicular to the central, longitudinal axis 35, and parallel to the central, lateral axis 36) is at least substantially equal to the circumference of the formed tubular separator 22, which may be at least approximately equal to the circumference of the interior surface of the cathode ring 20. In certain embodiments, the width of the fabric sheet 30 is greater than a desired circumference of the tubular separator 22 to provide an overlap in each formed layer of the separator 22. The length of the sheet 30 (along the elongated axis of the sheet) is greater than twice the height of the formed separator 22, to accommodate forming two separate plies of the formed separator 22 and a bottom surface of the separator 22. As a specific example, a planar fabric sheet 30 for use in a LR6 electrochemical cell may have a length (measured parallel to the longitudinal axis 35) of 3.882 inches, and a width (measured parallel to the lateral axis 36) of 1.200 inches.

As shown in FIG. 4A, the separator sheet 30 is continuous and defines two slits 34 extending perpendicular to the elongated axis 35 of the sheet 30, from opposing side edges. The two slits 34 are at least substantially aligned relative to one another (e.g., along a single line), and are offset relative to the central lateral axis 36 of the separator sheet 30. In certain embodiments, the slits 34 are offset relative to the central lateral axis 36 of the separator sheet by a distance at least substantially equal to the radius of the intended cylindrical separator 22. For example, the slits 34 may be offset by a distance of 0.125 inches relative to the central lateral axis 36. Once the cylindrical separator 22 is formed, the slits 34 are aligned with a bottom edge of the cylindrical sidewalls of the separator 22.

Figure 4B:
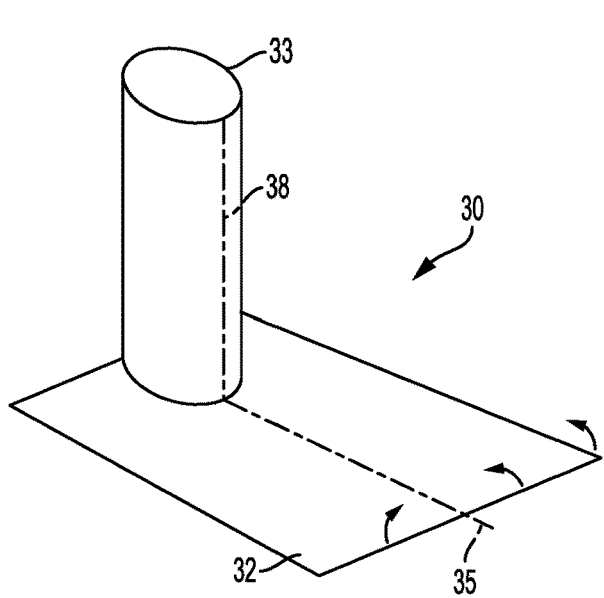

The slits 34 separate two opposing ends 32, 33 of the separator sheet, wherein each end 32, 33 extends between an end of the continuous, elongated separator sheet 30 to the slits 34. Due to the offset of the slits 34 relative to the central lateral axis 36 of the sheet 30, the opposing ends 32, 33 are of different length, defining a long end 33 and a short end 32. As shown in FIG. 4B, one of the ends (e.g., the long end 33) is formed into a cylinder by curling opposing side edges (edges parallel to the longitudinal axis 35 of the separator sheet 30) relative to one another until the opposing side edges meet or overlap, while remaining continuous with the opposite end (e.g., the short end 32) across a fold of the continuous separator sheet 30. Thus, the end 33 is wrapped at least 360 degrees to form a complete cylinder having a central axis aligned with the longitudinal axis 35 of the continuous separator sheet 30. In certain embodiments, the end 33 may be wrapped around a cylindrical separator insertion rod (not shown) having a diameter at least substantially equal to a desired diameter of the resulting cylindrical separator 22. In such embodiments, an edge of a flat bottom end of the separator insertion rod may be positioned offset relative to the centerpoint of the separator sheet 30. For example, an edge of the bottom end of the separator insertion rod may be offset by a distance at least substantially equal to the radius of the cylindrical separator 22. In such embodiments, the slits 34 of the separator sheet are aligned with a bottom edge of the separator insertion rod once the separator 22 is formed into a complete cylinder (e.g., such that the slits 34 are at least substantially aligned with a tangent of the cylindrical separator insertion rod).

Figure 4C:
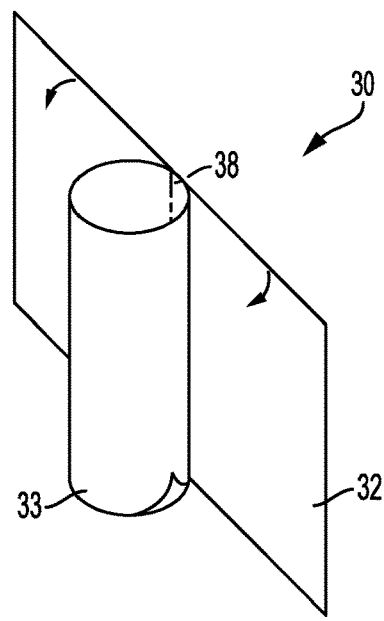

As shown in FIG. 4C, the separator sheet 30 is folded parallel to the lateral axis 36 of the separator sheet 30 to form a bottom end of the resulting cylindrical separator 22 while maintaining continuity of the separator sheet 30, and to position the unrolled end (e.g., the short end 32) tangent to the rolled and now cylindrically-shaped end. This results in two at least substantially parallel folds—one fold at least substantially aligned with the slits 34 of the separator sheet 30, and another fold positioned opposite the centerpoint of the sheet relative to the slits 34 (within the long end 33). The two folds are offset relative to the central lateral axis 36 of the sheet 30 by an at least approximately equal distance (e.g., equal to the radius of the cylindrical separator 22). The portion of the separator sheet 30 located between the two folds (e.g., aligned with the centerpoint of the separator sheet) forms the closed bottom end of the separator 22. Portions of the separator sheet 30 between the two folds that are outside of the cylindrical shape of the separator 22 (at this point defined by the cylindrical shape of the rolled end) may be folded upward against the cylindrical sidewall of the separator 22 such that they ultimately become positioned between the plies of separator, folded downward under the closed bottom end of the separator 22, or folded inward onto the top, internal surface of the closed bottom end. As yet another example, the slits may be configured such that no additional separator material is provided outside of the cylindrical sidewalls of the separator 22.

Figure 4D:
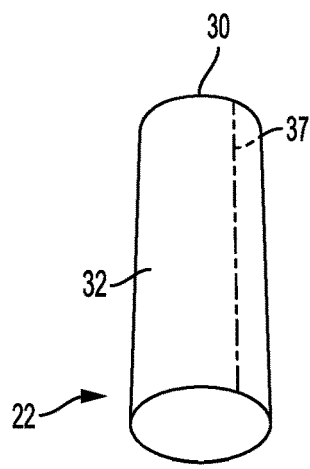

Once the unrolled end is positioned tangent to the rolled end (e.g., the short end 32 is positioned against a surface of the cylindrically-formed long end 33), the remaining planar end is curled around the outer surface of the previously rolled end to form an outer cylindrical layer of the separator 22 that is concentric with the inner cylindrical layer, while maintaining continuity with the closed bottom end of the separator 22 across a fold. Opposing edges (parallel to the longitudinal axis of the separator sheet) of the unrolled end are curled toward one another, around the outer surface of the previously formed cylinder until the opposing edges meet or overlap (thus extending at least 360 degrees around the formed cylinder), thereby forming a two-ply cylindrical separator 22 comprising a continuous separator sheet 30 as shown in FIG. 4D.

The resulting cylindrical separator 22 defines two seams—a first seam 37 where opposing edges of the short end 32 meet or overlap and a second seam 38 where opposing edges of the long end 33 meet or overlap. These seams are positioned on opposite sides of the resulting cylindrical separator 22 (e.g., along a common diameter of the cylindrical separator 22 and on opposite sides of a central axis of the cylindrical separator 22). In certain embodiments, the seams are at least substantially parallel with the central axis of the cylindrical separator 22. Moreover, in embodiments in which the opposing side edges of each end abut one another to form respective cylinders, the resulting sidewalls of the cylindrical separator 22 have an at least substantially uniform, two-ply thickness around the perimeter of the cylindrical separator 22.

In certain embodiments, the closed bottom end of the cylindrical separator 22 may be reinforced with an additional separator reinforcement layer 23. The reinforcement layer 23 may be embodied as an end cup having a closed bottom end and short sidewalls, or an end pad embodied as a circular and planar separator portion that may be aligned with the closed bottom end of the separator 22. This reinforcement layer 23, collectively with the closed bottom end of the separator 22 forms an at least two-layer closed bottom end of the separator 22 having a desired resistivity and a desired puncture resistance. In certain embodiments, the reinforcement layer 23 may be positioned external to the separator 22 (e.g., between the closed bottom end of the separator 22 and the closed end 14 of the cylindrical container 12). However it should be understood that the reinforcement layer 23 may be positioned within the interior of the cylindrical container 22, adjacent an inner surface of the closed bottom end. In certain embodiments, the reinforcement layer 23 and/or the one or more seams 37, 38 may be heat sealed to desirably maintain a two-layer construction of the separator 22 during manufacture of the electrochemical cell.

Once inserted into the electrochemical cell, the resulting separator 22 defines an exterior surface surrounding the outside of the resulting separator 22. The exterior of the sidewalls are in contact with an interior surface of the cathode, and the exterior bottom surface of the separator is in contact with a portion of the can.

In certain embodiments, one or more overlapping portions of the separator 22 sidewalls and/or bottom end are heat sealed to at least partially secure overlapping portions of the separator 22 relative to one another. For example portions of the separator 22 may be heat sealed as discussed in co-pending U.S. application Ser. No. 15/805,718, filed on Nov. 7, 2017, the contents of which are incorporated herein in their entirety. For example, a portion (e.g., a linear portion) of the separator 22 sidewalls extending between an open upper end of the separator 22 and a closed bottom end of the separator 22 may be heat sealed.

Method of Manufacturing an Electrochemical Cell

Figure 5:
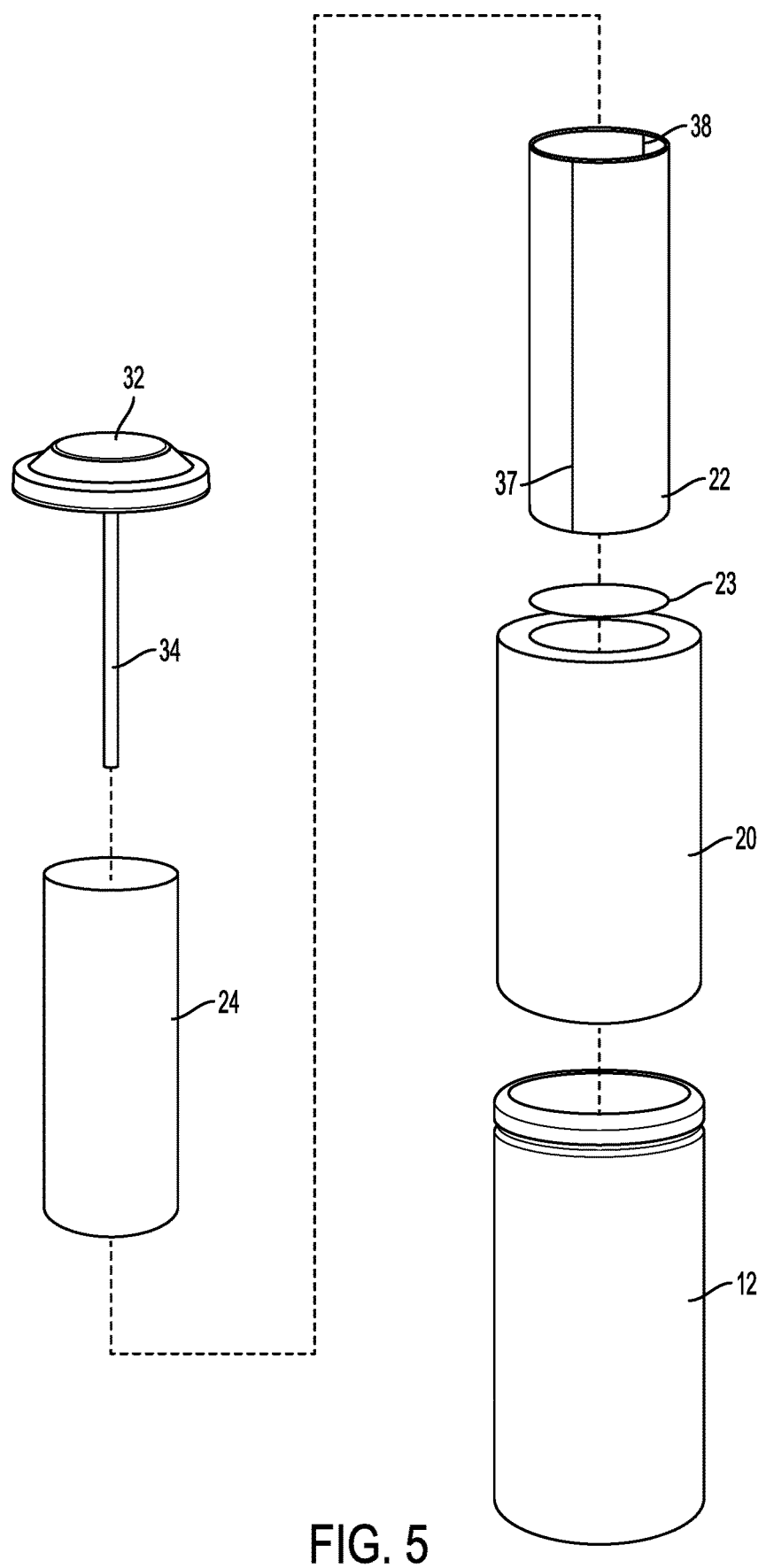
FIG. 5 is an exploded view of a bobbin-style electrochemical cell according to one embodiment.

FIG. 5 illustrates an exploded view of an electrochemical cell 10 schematically illustrating a manufacturing process for an electrochemical cell 10. Manufacturing of an electrochemical cell 10 according to various embodiments begins by providing a cylindrical container 12 having an open top end and a closed bottom end. In certain embodiments, the closed bottom end may define a protrusion (e.g., in the form of a plate welded onto the closed bottom end or a protrusion integrally formed with the cylindrical container 12 itself). Active materials are then added to the interior of the cylindrical container 12 through the open top end. Cathode material is first added to the cylindrical container 12 to form a cathode ring 20 adjacent the outer wall of the cylindrical container 12. As noted above, the cathode material may be premolded into cathode rings, and one or more cathode rings may be added into the interior of the cylindrical container 12. Alternatively, granular cathode material may be added to the interior of the cylindrical container 12, and a molding ram may be inserted into the interior of the cylindrical container 12 to impact mold the cathode material into a continuous cathode ring 20.

Once the cathode ring 20 is positioned within the interior of the cylindrical container 12, the cathode ring 20 has an exterior surface adjacent the interior surface of the cylindrical container 12 wall and an interior surface defining an opening (e.g., a cylindrical opening) at least substantially within the center of the cylindrical container 12. The separator 22 may then be placed within the opening within the interior of the cathode ring 22. As noted above, the cylindrical separator 22 comprises a continuous, rectangular separator sheet 30 rolled such that a first end of the separator sheet 30 (e.g., a long end 33) defines a first layer of the cylindrical separator sidewall and a second end of the separator sheet 30 (e.g., a short end 32) is rolled around the first layer of the cylindrical separator sidewall to define a second layer of the cylindrical separator sidewall. The first end of the separator sheet 30 is longer than the second end of the separator sheet, and accordingly a portion of the first end adjacent the second end forms the closed bottom end of the cylindrical separator 22. FIGS. 2A-2D illustrate steps for forming the cylindrical separator 22 according to one embodiment.

Moreover, the cylindrical separator 22 may be formed about a separator insertion rod having a cylindrical profile. Once the cylindrical separator 22 is formed about the separator insertion rod, the separator insertion rod may press the cylindrical separator 22 into the hollow interior of the cathode ring 20, and the separator insertion rod may then be removed from the electrochemical cell, leaving the separator 22 behind.

In certain embodiments, the cylindrical separator 22 may be placed into the interior hollow opening of the cathode ring 20 with a reinforcement layer 23 to provide additional separator layers at the closed bottom end to avoid formation of short circuits through a single layer portion of the separator within the closed bottom end. The reinforcement layer 23 may be positioned external to the cylindrical separator 22 or the reinforcement layer 23 may be positioned within an interior of the cylindrical separator 22.

After removal of the separator insertion tool, anode material may be added to the remaining opening within the interior of the separator 22, and free electrolyte may be added to the interior of the electrochemical cell 10. The anode material may be a gelled anode material that may be extruded or otherwise added to the interior of the separator 22. Thereafter, the anode 24, current collector 34, and seal arrangement 32 are put in place to seal the open end of the container 12 and to form a complete electrochemical cell 10. Again, because the separator 22 is provided substantially free of creases and/or wrinkles, the useful volume occupied by active material, including both cathode and anode material, is maximized within the interior of the electrochemical cell 10.

Example

A plurality of sample LR6 electrochemical cells were created having the separator configuration as discussed herein to test the performance of the electrochemical cells relative to various control samples. All of the electrochemical cells were created with a MnO$_2$—Zn alkaline chemistry. All of the samples were created using a commercially available separator sheet material having a 3-mil thickness, known as H&V BVA 02530. The control samples were created with a traditional, 2-piece cross-wrap separator design as discussed above, and the test samples were created with the one-piece separator configuration as discussed herein (having a planar sheet dimension of 3.882 inches by 1.200 inches) paired with a bottom cup configuration formed from the same separator material. Other than differences in the separator between the control and test samples, no other variables were introduced during this experiment.

The electrochemical cell samples (including both test samples and control samples) were subject to standardized high-drain rate service testing performed according to standardized ANSI testing procedures. On average, the test sample cells exhibited a 15% higher drain rate service as compared to the control samples. The inventors believe this increase in high drain rate service is attributable to the decreased internal cell resistance caused by the separator configuration.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of manufacturing an electrochemical cell, the method comprising:
   providing a cylindrical electrochemical cell can having an active material ring disposed proximate an interior surface of the cell can;
   forming a cylindrical separator comprising a continuous separator sheet defining (a) a closed bottom end and (b) a two-layer cylindrical sidewall, wherein forming the cylindrical separator comprises:
      providing the continuous separator sheet;
      forming lateral slits perpendicular to a longitudinal axis of the continuous separator sheet to separate a first end and a second end of the continuous separator sheet;
      rolling the first end to form a first cylindrical layer having a first seam; and
      rolling the second end around an exterior of the first cylindrical layer to form a second cylindrical layer having a second seam;
   inserting the cylindrical separator end into the interior of the active material ring;
   disposing a second active material within an interior of the separator; and
   sealing the electrochemical cell can.

2. The method of manufacturing an electrochemical cell of claim 1, wherein the first seam and the second seam are aligned with a diameter of the cylindrical sidewall.

3. The method of manufacturing an electrochemical cell of claim 1, further comprising positioning a separator reinforcement layer adjacent the closed bottom end of the cylindrical separator.

4. The method of manufacturing an electrochemical cell of claim 3, wherein positioning a separator reinforcement layer adjacent the closed bottom end comprises positioning a reinforcing cup adjacent a bottom exterior surface of the closed bottom end.

5. An electrochemical cell comprising:
   a container;
   a ring-shaped cathode disposed within the container wherein the cathode includes an exterior surface in contact with the container and an interior surface surrounding a hollow interior;
   an anode disposed within the hollow interior of the cathode; and
   a cylindrical separator positioned between the cathode and the anode, wherein the cylindrical separator comprises a continuous separator sheet defining (a) a closed bottom end, (b) a two-layer cylindrical sidewall defining a seam within each layer of the two-layer cylindrical sidewall, and (c) lateral slits perpendicular to a longitudinal axis of the continuous separator sheet, wherein the lateral slits separate a first end and a second end of the continuous separator sheet; and
   wherein the two-layer cylindrical sidewall comprises:
      a first cylindrical layer formed by the first end of the continuous separator sheet; and
      a second cylindrical layer formed by the second end of the continuous separator sheet, wherein the second end of the continuous separator sheet is formed around an exterior surface of the first cylindrical layer of the two-layer cylindrical sidewall.

6. The electrochemical cell of claim 5, wherein the seams comprise a first seam within the first cylindrical layer and a second seam within the second cylindrical layer and wherein the first seam and the second seam are aligned with a diameter of the two-layer cylindrical sidewall.

7. The electrochemical cell of claim 6, wherein:
   the first end of the continuous separator sheet is rolled into the first cylindrical layer such that opposing longitudinal edges of the first end of the continuous separator sheet meet at the first seam; and
   the second end of the continuous separator sheet is rolled around the first cylindrical layer such that opposing longitudinal edges of the second end of the continuous separator sheet meet at the second seam.

8. The electrochemical cell of claim 6, wherein the first seam is defined by overlapping portions of the first end of the continuous separator sheet and the second seam is defined by overlapping portions of the second end of the continuous separator sheet.

9. The electrochemical cell of claim 6, wherein the first seam is defined by abutted edges of the first end of the continuous separator sheet and the second seam is defined by abutted edges of the second end of the continuous separator sheet.

10. The electrochemical cell of claim 5, wherein the first end is longer than the second end of the continuous separator sheet.

11. The electrochemical cell of claim 10, wherein the length of each of the first end and the second end is greater than the height of the ring-shaped cathode.

12. The electrochemical cell of claim 11, wherein the length of the first end is longer than the combination of the height of the ring-shaped cathode and a diameter of the hollow interior of the ring-shaped cathode.

13. The electrochemical cell of claim 5, further comprising positioning a separator reinforcement layer adjacent the closed bottom end of the cylindrical separator.

14. The electrochemical cell of claim 13, wherein the separator reinforcement layer comprises one of a reinforcing cup or a reinforcing pad.

15. The electrochemical cell of claim 5, wherein the continuous separator sheet comprises 3 mil separator paper.

16. The method of manufacturing an electrochemical cell of claim 1, wherein rolling the second end around an exterior of the first cylindrical layer comprises forming the closed bottom end with a portion of the second end.

* * * * *